(12) United States Patent
Cazoulat et al.

(10) Patent No.: US 11,223,999 B2
(45) Date of Patent: Jan. 11, 2022

(54) TECHNIQUE FOR MANAGING A RIGHT OF ACCESS TO A NETWORK FOR A COMMUNICATING DEVICE

(71) Applicant: ORANGE, Issy-les-Moulineaux (FR)

(72) Inventors: Renaud Cazoulat, Chatillon (FR); Nicolas Ducrot, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/753,563

(22) PCT Filed: Oct. 1, 2018

(86) PCT No.: PCT/FR2018/052414
§ 371 (c)(1),
(2) Date: Apr. 3, 2020

(87) PCT Pub. No.: WO2019/069005
PCT Pub. Date: Apr. 11, 2019

(65) Prior Publication Data
US 2020/0305063 A1 Sep. 24, 2020

(30) Foreign Application Priority Data
Oct. 4, 2017 (FR) ...................................... 1759261

(51) Int. Cl.
*H04W 48/02* (2009.01)
*H02J 7/00* (2006.01)
(Continued)

(52) U.S. Cl.
CPC ......... *H04W 48/02* (2013.01); *H02J 7/00034* (2020.01); *H04M 1/67* (2013.01); *H04M 15/93* (2013.01); *H04M 2215/32* (2013.01)

(58) Field of Classification Search
CPC ..... H04W 48/02; H04W 48/20; H04W 72/04; H04W 72/12; H04W 76/00;
(Continued)

(56) References Cited

U.S. PATENT DOCUMENTS

| 2007/0262862 A1 | 11/2007 | Barrett et al. |
| 2009/0063680 A1* | 3/2009 | Bridges ............... H02J 13/0086 709/224 |
| 2012/0046015 A1 | 2/2012 | Little |

OTHER PUBLICATIONS

Pentikousis, Kostas. "In search of energy-efficient mobile networking." IEEE Communications Magazine 48.1 (2010): 95-103. (Year: 2010).*

(Continued)

*Primary Examiner* — Sharad Rampuria
(74) *Attorney, Agent, or Firm* — David D. Brush; Westman, Champlin & Koehler, P.A.

(57) ABSTRACT

The invention relates to a technique for managing a right of access to a network for a communicating device (20). The communicating device detects a connection to a charging unit (10) and transmits a charging request to a processing device (30). This charging request comprises an estimate of a requested amount of energy and a battery identifier. On receiving charging agreement, the communicating device supplies the battery identified by the charging unit with power according to the agreed amount of energy. The right of access of the communicating device to the network is extended in the network according to the agreed amount of energy.

9 Claims, 2 Drawing Sheets

(51) Int. Cl.
*H04M 1/67* (2006.01)
*H04M 15/00* (2006.01)

(58) Field of Classification Search
CPC ...... H02J 7/00034; H04M 1/67; H04M 15/93; H04M 2215/32; H04M 1/72448; H04B 7/2121; H04B 7/2123; H04J 2203/0069; H04Q 2213/394
See application file for complete search history.

(56) References Cited

OTHER PUBLICATIONS

Abousleiman, Rami, and Richard Scholer. "Smart charging: System design and implementation for interaction between plug-in electric vehicles and the power grid." IEEE Transactions on Transportation Electrification 1.1 (2015): 18-25. (Year: 2015).*

International Search Report dated Nov. 14, 2018 for corresponding International Application No. PCT/FR2018/052414, filed Oct. 1, 2018.
Written Opinion of the International Searching Authority dated Nov. 14, 2018 for corresponding International Application No. PCT/FR2018/052414, filed Oct. 1, 2018.
International Preliminary Report on Patentability and English translation of the Written Opinion of the International Searching Authority dated Nov. 23, 2018 for corresponding International Application No. PCT/FR2018/052414, filed Oct. 1, 2018.
Angelopoulos Constantinos Marios et al: "Wireless energy transfer in sensor networks with adaptive, limited knowledge protocols", Computer Networks, Elsevier, Amsterdam, NL, vol. 70, May 16, 2014 (May 16, 2014), pp. 113-141, XP029010086.
Safak Bayram I et al: "Electric Power Allocation in a Network of Fast Charging Stations", IEEE Journal On Selected Areas in Communications, IEEE Service Center, Piscataway, US, vol. 31, No. 7, Jul. 1, 2013 (Jul. 1, 2013), pp. 1235-1246, XP011516377.

* cited by examiner

TECHNIQUE FOR MANAGING A RIGHT OF ACCESS TO A NETWORK FOR A COMMUNICATING DEVICE

CROSS-REFERENCE TO RELATED APPLICATIONS

This Application is a Section 371 National Stage Application of International Application No. PCT/FR2018/052414, filed Oct. 1, 2018, the content of which is incorporated herein by reference in its entirety, and published as WO 2019/069005 on Apr. 11, 2019, not in English.

FIELD OF THE DISCLOSURE

The invention pertains to the general field of telecommunications.

The invention relates more particularly to a technique for managing a right of access to a network for a communicating device.

BACKGROUND OF THE DISCLOSURE

The technique for managing a right of access to a network lies within the field of communicating devices having a rechargable battery-based power supply.

The term "communicating device" or "connected device" is understood to mean a device able to exchange information with other devices. Among these devices, a distinction is drawn for those that exchange information via a communication network administered by a network operator, with, where applicable, another device, a communication terminal or computer equipment of the communication network. The communication network may be based on cellular mobile network technologies, known as 2G, 3G, 4G or 5G, and on low-consumption and long-range LPWA (for "low power wide area") network technologies, such as the LoRa network.

From the point of view of the user, communicating by means of what are known as long-range networks is distinguished from communicating by means of what are known as short-range networks (such as Bluetooth, Bluetooth Low Energy, Wi-Fi, Zigbee, Z-Wave, etc.) through the following advantages:
  independence from intermediary equipment for accessing a wide area communication network;
  security: the majority of long-range technologies intrinsically incorporate security features, such as authentication and encryption, which offer a native security guarantee for applications implemented on this network;
  ease of configuration and of use: there is no need to configure a security key or to perform pairing, which operations may prove to be extremely complex for the user when the device does not incorporate a screen or has limited input/output peripherals, or for users not used to using this type of technology.

To connect a communicating device to a long-range communication network, it is generally necessary to subscribe to an offer from the operator of the communication network. The communicating device may then connect autonomously and transparently for its user to access points of the communication network that are compatible with the communication means of the communicating device.

However, it is often not easy for the user of the communicating device to manage the right of access to the network allowing them to access the network of the operator. A right of access to the network in the form of a subscription to the operator entails recurring charges. A right of access to the network in the form of prepaid credit requires this credit to be topped up once it has run out.

SUMMARY

One of the aims of the invention is to remedy inadequacies/drawbacks of the prior art and/or to afford improvements thereto.

According to a first aspect, the invention relates to a method for managing a right of access to a network for a communicating device. The method comprises:
  detecting that the communicating device is connected to a charging unit;
  the communicating device transmitting a charging request to a processing device, said charging request comprising an estimate of a requested amount of energy and a battery identifier;
  on receiving charging agreement, supplying the battery identified by the charging unit with power according to the agreed amount of energy,
  the right of access of the communicating device to the network being extended in the network according to the agreed amount of energy.

The expression "right of access to a communication network" refers to a right of use of the network. For as long as this right of access is valid, the communicating device may access the network and thus use the network to communicate with other devices.

By virtue of this technique, the right of access to a network is extended during an act of charging the battery and according to an amount of energy which will charge the battery of the communicating device. The act of charging the battery thus results in a right of access to the network being extended. This technique thus guarantees the communicating device a right to communicate by means of a network for as long as the battery is capable of providing the device with power.

The user process is thus simplified: to retain access to a communication network, the user does not have to manage renewal of their right of access to the network. All that is required for the user both to charge their communicating device and to extend their right of access to the network is to connect their device to a charging unit. The user does not have to take care to keep up their subscription to the network operator.

This technique for managing a right of access to a network is particularly well suited to implementation in communicating devices, as these are very often supplied with power by rechargeable batteries, so as to be able to be moved easily.

The user process is known and mastered from beginning to end by a vast majority of consumers and end users: all that is required is to charge the battery of the device. Such a technique is able to facilitate and to encourage the development of new communicating devices within the industry of the Internet of Things, given the problems and restrictions that it removes with regard to accessing the long-range communication network. These restrictions are both technical and commercial with regard to the complexity in managing the subscription to a right of access of a communicating device to the network.

No modification is made to the charging unit which is connected to the communicating device. Any charging unit may be used.

In one particular embodiment, the rechargeable battery is irremovable.

The various embodiments or embodiment features mentioned hereinafter may be added independently or in combination with one another to the management method such as defined above.

In one particular embodiment of the management method, once the battery is discharged, the access of the communicating device to the network is restricted to transmission to the processing device.

Once the battery is discharged, the right of access to the network is no longer available beyond communicating to the processing device. This strengthens the security of the method for managing the right of access to the service.

In one particular embodiment, the management method comprises associating the identifier of the battery with a network identifier of the communicating device, making it possible to extend the right of access to the network for the associated network identifier.

Thus, the battery identifier makes it possible for the processing device to obtain the network identifier in order to extend the right of access to the network.

In one particular embodiment, the charging request further comprises a network identifier of the communicating device, making it possible to extend the right of access to the network for the associated network identifier.

The processing device thus directly receives the network identifier for which the right of access to the network is to be extended.

In one particular embodiment, the management method comprises the communicating device obtaining the battery identifier.

In one particular embodiment, the right of access to the network is extended for a quality of service selected by a user associated with a network identifier of the communicating device, making it possible to extend the right of access to the network for the associated network identifier.

The user may thus select a quality of service when the right of access to the network is being extended. This quality of service is associated with a frequency of access to the network or frequency of use of the network. The user process is thus simplified.

In one particular embodiment, the charging agreement is conditional on agreement of a user associated with a network identifier of the communicating device, making it possible to extend the right of access to the network for the associated network identifier.

This makes it possible to guarantee agreement of the user associated with the subscription of the communicating device. Specifically, it is this user who will pay the bill from the network operator associated with the subscription.

According to a second aspect, the invention relates to a communicating device intended to be supplied with power by a rechargeable battery. This device comprises:
a communication module, designed to communicate with devices of a communication network;
a processing module, designed to:
  detect a connection to a charging unit;
  transmit a charging request to a processing device, said charging request comprising an estimate of a requested amount of energy and a battery identifier;
  on receiving charging agreement, supply the battery identified by the charging unit with power according to the agreed amount of energy, the right of access of the communicating device to the network being extended in the network according to the agreed amount of energy.

The advantages outlined for the method for managing a right of access to a network according to the first aspect are able to be transposed directly to the communicating device.

This device may of course include, in structural terms, the various features relating to the management method such as described above, which features may be combined or taken individually.

According to a third aspect, the invention relates to a program for a communicating device, comprising program code instructions intended to command the execution of those of the actions of the method for managing a right of access to a network described above that are implemented by the communicating device when this program is executed by this device, and a recording medium able to be read by a device and on which a program for a device is recorded.

The advantages outlined for the method for managing a right of access to a network according to the first aspect are able to be transposed directly to the program for a communicating device and to the recording medium.

BRIEF DESCRIPTION OF THE DRAWINGS

The technique for managing a right of access to a network for a communicating device will be better understood with the aid of the following description of particular embodiments, with reference to the appended drawings, in which.

DETAILED DESCRIPTION OF ILLUSTRATIVE EMBODIMENTS

Figure 1:
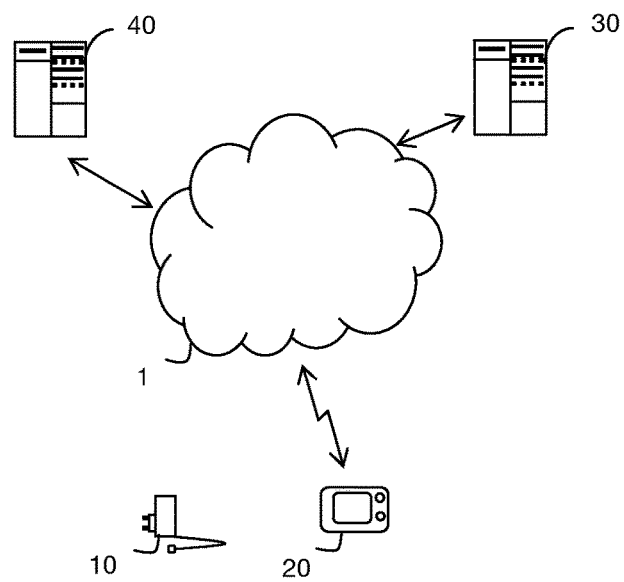
FIG. 1 shows a communicating device in its environment in one particular embodiment.

FIG. 1 shows an environment in which the method for managing a right of access to a network in one particular embodiment is implemented. The environment shown comprises a communicating device 20 accessing a communication network by means of a mobile access network 1. A communicating or connected device or object is an object designed to exchange information via a communication network, with, where applicable, another object, a communication terminal or computer equipment of the communication network. A mobile terminal, a watch designed to transmit information to a mobile terminal via a wide area communication network such as the Internet, and a smoke detector designed to communicate with a remote mobile terminal in order to signal the presence of smoke in a house thus constitute examples of connected objects. In a first example, the communicating device 20 is a medical monitoring module, designed to measure physical characteristics of the user wearing it, for example their heart rate, and to transmit measurements to a remote computer device via a communication network (not shown in FIG. 1). In a second example, the communicating device 20 is a geolocation module, designed to transmit geolocation data to a remote computer device via a communication network.

The mobile access network corresponds for example to a GSM, EDGE, 3G, 3G+ or 4G (also known as LTE for "Long-Term Evolution") mobile communication network. The mobile access network may also correspond to a low-consumption and long-range LPWA (for "low power wide area") network, such as the LoRa network.

The expression "right of access to a network" refers to an item of subscription data managed by a network operator that allows the communicating device 20 to access a network. This item of subscription data depends on the technology for accessing the communication network which the communicating device 20 is to access. This right of access to the network is thus managed by the network operator. This right of access to a network corresponds to a right of use of the network. For as long as this right of access is valid, the communicating device may access the network and thus communicate with other devices.

In the embodiment shown, the communicating device 20 transmits data to a server 40. This server 40 is designed to provide a service on the basis of the data received. This service may correspond for example to a health service, a care service, a location service, etc. For this location service, the transmitted data relate to a geographical place. A processing device 30 is designed to manage the service. For this, it is designed to interact with the communicating device 20, with a user of the service and with devices of the operator of the mobile communication network. These interactions are described below in relation to the description of the method for managing a right of access to a network.

The communicating device 20 may be any type of terminal allowing data to be transmitted, such as a mobile telephone, a smartphone, a tablet, a connected object, etc.

This communicating device 20 comprises a battery and is rechargeable by means of a charging unit 10.

The processing device 30 is designed in particular to receive messages that are sent thereto. In one particular embodiment, these messages correspond to short messages sent to a telephone number associated with the processing device 30. In another particular embodiment, these messages take the form of a message for a supplementary service for unstructured data (USSD for "Unstructured Supplementary Service Data") which is associated with the processing device 30. In another particular embodiment, these messages take the form of an HTTP (for "Hypertext Transfer Protocol") request sent to a location address (URL for "Uniform Resource Locator") which is associated with the processing device 30. There is no limitation attached to the way in which these messages are transmitted to the processing device 30.

Figure 2:
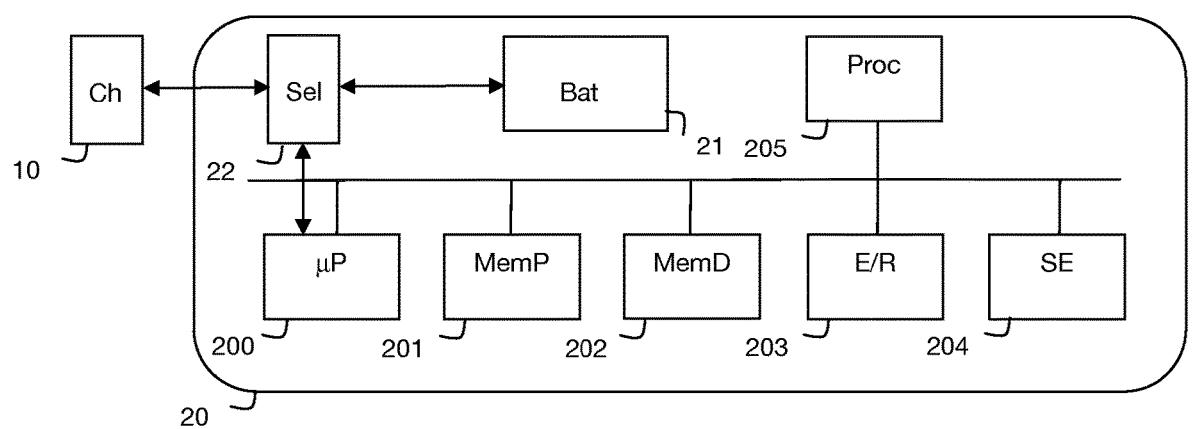
FIG. 2 shows a communicating device in one particular embodiment.

FIG. 2 schematically illustrates a communicating device 20 and a charging unit 10 in one particular embodiment.

The charging unit 10 comprises in particular means that are designed to supply a battery to be charged with power via a connector of the communicating device (not shown in FIG. 1).

The format of the battery may be based on an existing battery standard, such as LR6, LR3, LR14, 6LR61, CR2032, CR2016, CR2012, CR1220, etc. In another particular embodiment, the format of the electric power supply module may be based on a battery format specific to the communicating device, tailored to the use thereof, in particular to the format, power consumption and connectivity requirements thereof.

The communicating device 20, as shown in FIG. 2, comprises in particular:
 a rechargeable battery 21;
 a selection circuit 22;
 a processor 200 for executing code instructions of software modules;
 a memory area 201, designed to store a program that comprises code instructions for implementing steps of the management method;
 a storage memory 202, designed to store data used in the implementation of the management method;
 a communication module 203, forming a communication interface with a communication network, designed to communicate with devices of a communication network;
 a security element 204;
 a processing module 205.

The rechargeable battery 21 is inserted into a receptacle of the communicating device 20. The receptacle is for example molded and able to be accessed by removing a casing of the communicating device 20. In one particular embodiment, the battery is irremovable.

The selection circuit 22 is for example an integrated circuit such as the component MCP73831T-2ATI/OT by Microchip.

The selection circuit 22 is designed to receive, as input, the electric current:
 from the charging unit 10 via a first input, when it is connected to the communicating device 20 by means of the connector provided for this purpose;
 from the battery 21 via a second input, when no charging unit is connected to the device (subject to the battery being charged, of course).

The selection circuit 22 is designed to distribute the received electric current to:
 a first output, to which the battery 21 is connected; and
 a second output, to which the components of the communicating device 20 are connected.

The selection circuit 22 is designed to be controlled by the processing module 205. In a first distribution mode, the selection circuit 22 distributes the electric current received from the charging unit via the first input only to the second output: the battery 21 is not being charged. In a second distribution mode, the selection circuit 22 distributes the electric current received from the charging unit via the first input to the first and second outputs: the battery 21 is being charged. The selection circuit 22 is thus driven by the processing module 205 to switch from the first distribution mode to the second distribution mode, and vice versa.

When no charging unit is connected to the communicating device, in a third distribution mode, the selection circuit 22 is designed to distribute the electric current received from the battery 21 via the second input to the second output, in order to supply the components of the communicating device with power.

The communication module 203 corresponds to a transmitter/receiver module depending on the radio access technology.

The security element 204 is an inviolable dedicated platform, comprising hardware and software, able to securely host applications and their confidential and cryptographic data, and providing a secure application execution environment, for example a UICC card.

In one particular embodiment, the security element 204 is an eUICC card ("embedded universal integrated circuit card"), also called "eSIM" ("embedded subscriber identity module"), as is currently undergoing technical specification in the framework of the GSMA association.

When the communication network is a mobile network, the security element 204 may correspond to a conventional SIM card, which has been configured beforehand for a network operator. Still for this same type of communication network, the security element 204 may correspond to a remotely programmable SIM card, that is to say one able to be configured remotely or "over the air". This technique is known under the term remote post-allocation of an access profile of a security element. An access profile has been generated by a subscription data management server, not shown in FIG. 1, linked to the operator. The access profile comprises an application for accessing the network and associated access data (reference is made to "credentials"), such as cryptographic keys and algorithms. Once the access profile has been installed in the security element 204, it allows access to an infrastructure of a given mobile network on condition of a valid right of access. It makes it possible in particular to authenticate the communicating device 20, more precisely the security element 204, when accessing the network of the operator.

When the communication network is a long-range and low-consumption network, for example LoRa, an item of access data corresponds to a communication key that allows the communicating device 20 to authenticate itself to equipments of the communication network. By way of illustrative example, the item of access data is the LoRa network key. This network key allows the security element 204 to calculate one or more session keys, called "network session key".

The security element 204 is associated with a network identifier. This network identifier allows a subscriber to be identified for access to the network. For a 2G, 3G or 4G mobile network, this unique identifier may for example correspond to an International Mobile Subscriber Identity (IMSI). For a long-range and low-consumption network, for example LoRa, this unique identifier may for example correspond to the unique identifier of the device (DevEUI).

A battery identifier is associated with the battery 21. This battery identifier corresponds for example to an IEEE EUI-48 (for "Extended Unique Identifier"). This unique identifier is a number coded on 48 bits allowing in particular the manufacturer and the battery to be identified.

The battery 21 is in particular designed to supply the processing module 205 with its remaining energy level.

In one particular embodiment, the battery 21 is also designed to deliver its battery identifier to the processing module 205, optionally on request of the latter.

It is emphasized at this juncture that the communicating device 20 also comprises other processing modules, not shown in FIG. 2, that are designed to implement the various functions of a communicating device. The second exemplary embodiment relates in particular to a geolocation module.

Figure 3:
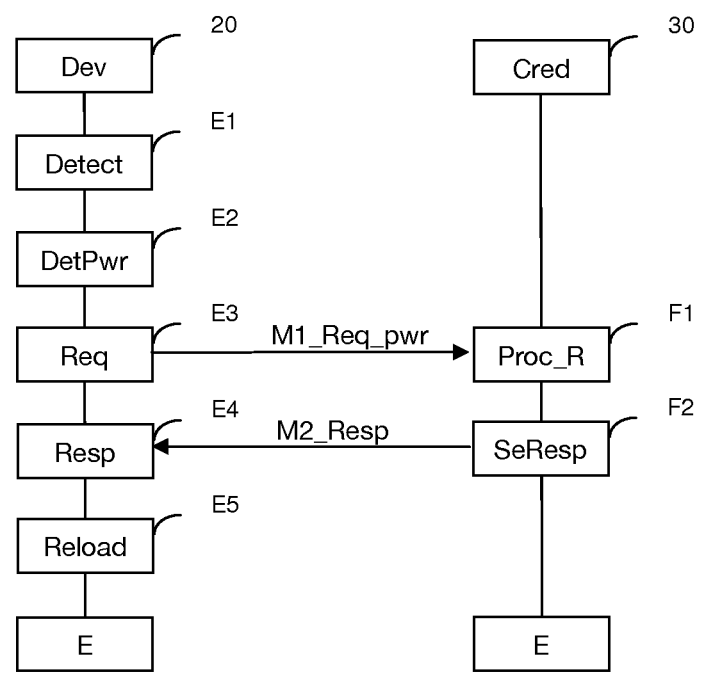
FIG. 3 illustrates steps of a method for managing a right of access to a network according to one particular embodiment.

The method for managing a right of access to the network implemented by the communicating device will now be described with reference to FIG. 3.

In the initial state, the communicating device 20 is supplied with power by its battery 21. The selection circuit 22 is thus set to the third distribution mode.

The communicating device 20 detects (step E1) that the charging unit 10 is connected thereto. This connection may be made by a user of the device 20, independently of the remaining energy of the battery 21. The communicating device 20 commands the selection circuit 22 to switch to the first distribution mode: the battery 21 is not being charged.

The communicating device 20 then determines (step E2) an estimate of an amount of energy to be delivered by the charging unit 10. This amount of energy is estimated according to the remaining energy of the battery 21 and the rated capacity thereof.

The communicating device 20 transmits (step E3) a charging request (M1) to the processing device 30. This charging request M1 comprises the estimate of a requested amount of energy and a battery identifier. The battery identifier corresponds to that of the battery 21 and is obtained by the communicating device 20 by configuration or when the device is powered up, or when it is requested of the battery 21.

This charging request M1 is received (step F1) by the processing device 30.

The processing device 30 then interacts with devices of the communication network in order to extend the right of access of the communicating device to the network according to the requested amount of energy. The right of access of the communicating device 20 to the network is identified by a network identifier of the communicating device. This network identifier makes it possible to identify the right of access to the network and thus to extend the right of access to the network in the devices of the network of the operator.

The processing device 30 then transmits (step F2) charging agreement M2 comprising an agreed amount of energy to the communicating device 20. This charging agreement M2 is received (step E4) by the communicating device 20.

The communicating device 20 commands the selection circuit 22 to switch to the second distribution mode: the battery 21 is being charged. Additionally, the communicating device 20 monitors the amount of energy delivered by the charging unit 10 according to the agreed amount of energy.

Thus, the communicating device 20 benefits from a network access right which is extended according to the agreed amount of energy. The user process is facilitated with regard to managing the right of access of their communicating device 20 to the network.

In one particular embodiment, once the battery is discharged, the access of the communicating device 20 to the network is restricted to transmission to the processing device 30. Any and all transmission to a device other than the processing device is blocked. This makes it possible to guarantee to the operator of the communication network that access to the communication network is restricted for as long as the right of access to the network has not been extended. Connecting the charging unit 10 does not allow the communicating device to regain access to the network. In addition, the restricted access to the network allows the communicating device 20 to trigger the extension of the right of access to the network, allowing this network access restriction to be lifted. The user process is again facilitated, because approaching the network operator in order to extend the right of access to the network is initiated from the communicating device 20.

The network identifier of the communicating device 20 is used to extend the right of access to the network. This network identifier allows the network operator to identify the subscription of the user. In one particular embodiment, this network identifier is transmitted by the communicating device 20 along with the charging request M1. Thus, the processing device 30 directly obtains the network identifier from the charging request.

In another particular embodiment, in a registration phase, the communicating device 20 transmits the battery identifier of its battery 21 and the network identifier to the processing device 30. The processing device 30 then memorizes this association between the battery identifier and the network identifier. When processing the charging request M1, the processing device 30 then reads the network identifier associated with the battery identifier. Thus, the processing device 30 obtains the network identifier from the battery identifier received in the charging request.

In yet another particular embodiment, in a registration phase, the communicating device 20 transmits the network identifier and a service identifier, for example an alias, to the processing device 30. The processing device 30 then memorizes this association between the service identifier and the network identifier. When processing the charging request M1, the processing device 30 then reads the network identifier associated with the service identifier. Thus, the processing device 30 obtains the network identifier from the service identifier received in the charging request.

In the embodiment described above, in step F1, the processing device 30 interacts with devices of the communication network in order to extend the right of access of the communicating device to the network according to the amount of energy. This extension may be subject to prior agreement of the user with whom the subscription (and therefore the network identifier) is associated. This prior agreement may be made by means of a human-machine interface of a device of this user, for example their mobile terminal. The charging agreement transmitted to the communicating device 20 is conditional on agreement of the user. This makes it possible to guarantee that the contract subscriber does indeed authorize the charging of the battery, and hence the extension of the right of access to the network. Thus, when the communicating device 20 is no longer in the possession of this user and the battery is discharged, the right of access to the network is no longer valid.

In one particular embodiment, the user is also called upon to select a quality of service for the extension of the right of access to the network. A quality of service defines in particular the frequency of access to the network or the frequency of use of the network by the communicating device. The user is then billed according to the selected quality of service. By way of illustration, for a service such as geolocation, the quality of service is defined according to the frequency of transmission of geolocation positions. Still by way of illustration, for a service such as a care service, the quality of service is defined according to the frequency of transmission of medical measurements.

The embodiments that have been described are based on a single battery 21. Some communicating devices may need to combine a plurality of rechargeable batteries. The embodiments are easily transposable to this combination of batteries. The energy is estimated for the combination of batteries. A single battery identifier may be provided in the charging request.

In addition to extending the right of access to the network, a right of access to a service may also be extended by means of this management technique. The right of access to a service corresponds for example to:

access to one or more items of data available on a remote server;

access to an application or a set of applications on a remote server.

It is understood that this technique for managing a right of access to the network makes it possible to simplify the experience for users of a communicating device. Indeed, all that is required is for the user to connect the communicating device to a charging unit to extend the network access right of the communicating device according to the power supplied. It is not necessary to approach an operator. The user simultaneously tops up the battery of their communicating device and the right of access to a network.

There is no limitation attached to these various embodiments, and those skilled in the art are capable of defining further embodiments that extend a right of access to a network according to power to be delivered by a charging device.

The technique for managing a right of access to the network is implemented by means of software components and/or hardware components. In this regard, the term "module" may correspond in this document equally to a software component, to a hardware component or to a set of hardware and/or software components, able to implement a function or a set of functions, according to what is described above in respect of the module in question.

A software component corresponds to one or more computer programs, one or more subroutines of a program, or more generally to any element of a program or of software. Such a software component is stored in memory and then loaded and executed by a data processor of a physical entity, and is able to access the hardware resources of this physical entity (memories, recording media, communication buses, electronic input/output cards, user interfaces, etc.).

In the same way, a hardware component corresponds to any element of a hardware assembly. It may be a programmable or non-programmable hardware component, with or without an integrated processor for executing software. It is for example an integrated circuit, a chip card, an electronic card for executing firmware, etc.

In one particular embodiment, the processing module 205 is designed to implement the steps of the method for managing an access right described above that are implemented by the communicating device. These are preferably software modules comprising software instructions for executing the steps (or the actions) of the management method described above that are implemented by a communicating device. The invention therefore also relates to:

a program for a communicating device, comprising program code instructions intended to command the execution of the steps (or the actions) of the management method described above when said program is executed by this communicating device;

a recording medium able to be read by a communicating device and on which the program for a communicating device is recorded.

The software modules may be stored in or transmitted by a data medium. This may be a hardware storage medium, for example a CD-ROM, a magnetic diskette or a hard disk, or a transmission medium such as an electrical, optical or radio signal, or a telecommunication network.

Thus, the processing module 205 is configured:

to detect a connection to a charging unit 10;

to transmit a charging request to a processing device 30, said charging request comprising an estimate of a requested amount of energy and a battery identifier;

on receiving charging agreement, to supply the battery identified by the charging unit with power according to the agreed amount of energy, the right of access of the communicating device to the network being extended in the network according to the agreed amount of energy.

Although the present disclosure has been described with reference to one or more examples, workers skilled in the art will recognize that changes may be made in form and detail without departing from the scope of the disclosure and/or the appended claims.

The invention claimed is:

1. A management method for managing a right of access to a communication network for a communicating device, said method comprising the following acts performed by the communicating device:

detecting that the communicating device is connected to a charging unit;

upon detection, the communicating device transmitting a charging request to a processing device, said charging request requesting a charging of a battery and of said right of access for the communicating device identified by a network identifier and comprising an estimate of a requested amount of energy and an identifier of the battery;

on receiving a charging agreement from the processing device, supplying the identified battery by the charging unit with power according to an agreed amount of energy, the right of access of the communicating device identified by said network identifier being extended by the processing device in the communication network according to the agreed amount of energy by interaction with communication network devices, accessing to said communication network by the communicating device identified by said network identifier.

2. The management method as claimed in claim 1, wherein, once the battery is discharged, the access of the communicating device to the communication network is restricted to transmission of messages to the processing device.

3. The management method as claimed in claim 1, comprising associating the identifier of the battery with a network identifier of the communicating device, making it possible to extend the right of access to the network for the associated network identifier.

4. The management method as claimed in claim 1, wherein the charging request further comprises a network identifier of the communicating device, making it possible to extend the right of access to the network for the associated network identifier.

5. The management method as claimed in claim 1, comprising the communicating device obtaining the battery identifier.

6. The management method as claimed in claim 1, wherein the right of access to the network is extended by the processing device for a quality of service selected by a user associated with said network identifier of the communicating device, making it possible to extend the right of access to the communication network for the associated network identifier.

7. The management method as claimed in claim 1, wherein the charging agreement is provided by the processing device conditional on agreement of a user associated with said network identifier of the communicating device, making it possible to extend the right of access to the communication network for the associated network identifier.

8. A communicating device configured to be supplied with power by a rechargeable battery, said device comprising:
   a communication interface configured to communicate with devices of a communication network;
   a processor to:
   detect a connection to a charging unit;
   upon detection, transmit a charging request to a processing device over the communication network using the communication interface, said charging request requesting a charging of a battery and of said right of access for the communicating device identified by a network identifier and comprising an estimate of a requested amount of energy and an identifier of the battery;
   on receiving charging agreement from the processing device, supply the identified battery by the charging unit with power according to an agreed amount of energy,
   the right of access of the communicating device identified by said network identifier being extended in the communication network by the processing device according to the agreed amount of energy by interaction with communication network devices,
   access to said communication network by the communicating device identified by said network identifier.

9. A non-transitory computer-readable recording medium on which program is recorded comprising program code instructions, which when executed by a processor of a communicating device command execution of a method for managing a right of access to a communication network for the communicating device, wherein the code instructions configure the communicating device to:
   detect that the communicating device is connected to a charging unit;
   upon detection, transmit a charging request to a processing device, said charging request requesting a charging of a battery and of said right of access for the communicating device identified by a network identifier and comprising an estimate of a requested amount of energy and an identifier of the battery;
   on receiving a charging agreement from the processing device, supply the identified battery by the charging unit with power according to an agreed amount of energy,
   the right of access of the communicating device identified by said network identifier being extended by the processing device in the communication network according to the agreed amount of energy by interaction with communication network devices,
   access to said communication network by the communicating device identified by said network identifier.

* * * * *